Nov. 6, 1956  W. H. HARSTICK ET AL  2,769,647
PIPE-LINE ASSEMBLY AND COUPLING MEANS THEREFOR
Filed April 14, 1954
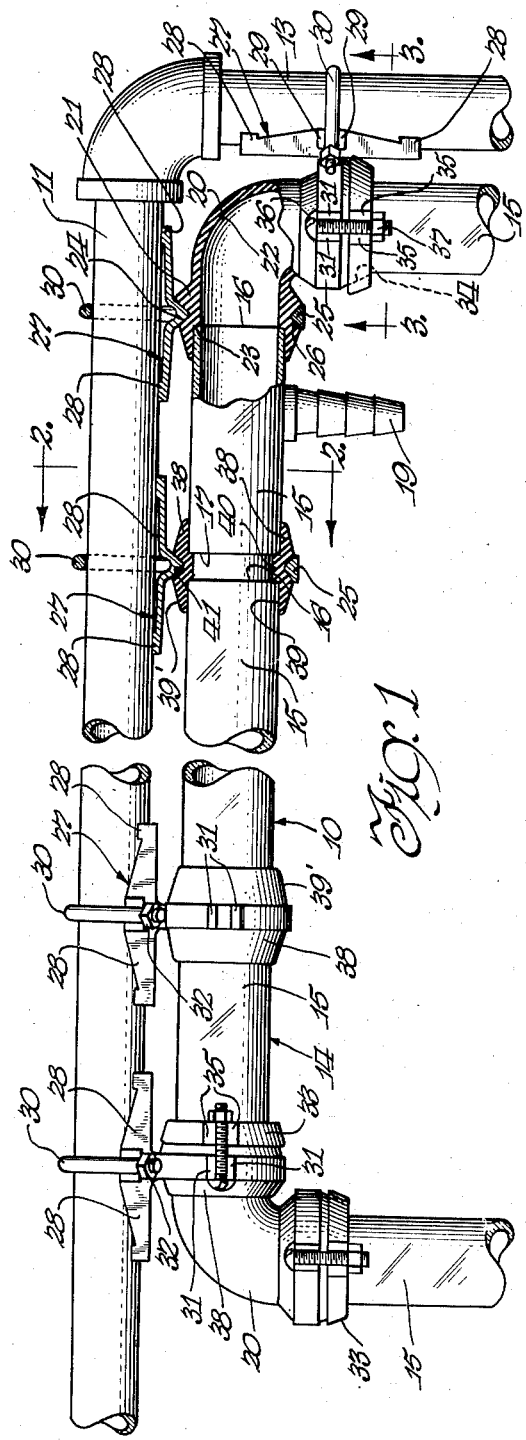
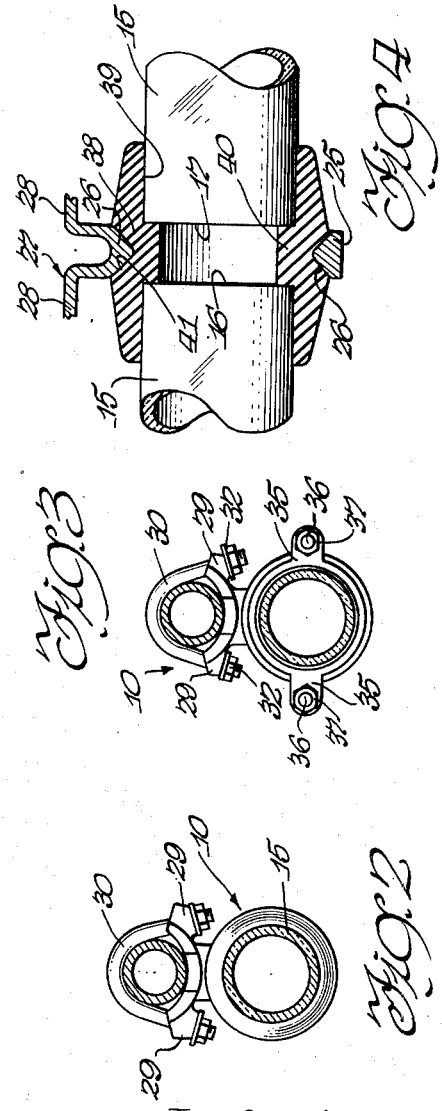
Inventors
William H. Harstick
Floyd G. Hodsdon
Harold W. Hein
Paul O. Pippel
Atty.

United States Patent Office 2,769,647
Patented Nov. 6, 1956

2,769,647

PIPE-LINE ASSEMBLY AND COUPLING MEANS THEREFOR

William H. Harstick, Oak Park, Floyd G. Hodsdon, La Grange, and Harold W. Hein, Chicago, Ill., assignors to International Harvester Company, a corporation of New Jersey Application April 14, 1954, Serial No. 423,032

10 Claims. (Cl. 285—31)

This invention relates to an improvement in pipe-line assemblies. More specifically this invention relates to a pipe-line assembly for milking systems including an improvement in coupling devices.

In the use of pipe-line milking systems a vacuum pipe-line generally extends in a horizontal direction across a series of milking stalls. The vacuum line is suitably connected to a vacuum pump or other source of vacuum. The vacuum line generally has suitable pulsator connections which perform in the conventional operation of the milking system. In addition to the vacuum line a milk receiving line is also provided. The milk receiving line receives the milk from the animals and the milk is transported to a suitable container. In view of the very high sanitary requirements it is necessary that the milk line be constructed in separable sections so that it can easily and quickly be disassembled for cleaning purposes. So that the milk flow may be observed, it is also desirable to make the milk line of transparent material. Disassembly of the milk line has provided many problems since an effective seal between the separable conduits must be obtained and yet assembly and disassembly must be quickly made with a minimum of effort on the part of the operator. Furthermore, all parts of the system must be easy to clean so that the possibilities of contamination are greatly reduced. It is a prime object of this invention therefore, to provide an improved pipe-line assembly especially adapted for milk parlor installations.

Still another object is to provide an improved pipe-line assembly wherein one of the pipe-lines is connected to and supported from the other, the first pipe-line comprising a plurality of quickly removable couplings and connections.

A still further object is to provide an improved pipe-line assembly consisting of adjacent conduits, one of said conduits including a plurality of separable sections having couplings therefore which will facilitate the assembly and disassembly of the separable conduits for cleaning purposes.

An ancillary object is to provide an improved coupling for connecting tubular sections of a pipe-line, the coupling also including an improved bracket construction for supporting the pipe-line on a tubular support.

Still another object is to provide an improved quick detachable coupling for connecting separable tubular sections of the pipe-line, the coupling being of resilient construction and designed to permit effective cleaning.

These and further objects will become more readily apparent from a reading of the specification when examined in connection with the accompanying sheet of drawing.

In the drawing:

Figure 1 is a side elevational view of a pipe-line assembly showing certain portions thereof in section;

Figure 2 is a sectional view of a pipe-line assembly taken substantially along the line 2—2 of Figure 1;

Figure 3 is a sectional view taken substantially along the line 3—3 of Figure 1; and Figure 4 is an enlarged cross sectional view of a connector or coupling for connecting the separable sections of a pipe-line milking system.

A pipe-line assembly of a type normally adapted for milking machine operation is generally designated by the reference character 10. The assembly 10 comprises a conduit 11 which is generally considered the vacuum line of the system and is connected to a source of vacuum such as a pump (not shown). The conduit 11 at one end is provided with a right angle connector 13. A second conduit 14 extends substantially parallel to the conduit 11, the second conduit 14 generally being considered the milk receiving line which transports milk from the animals to a suitable central container (not shown). The second conduit consists of a plurality of separable tubular sections 15, the sections generally consisting of a transparent material such as clear plastic or glass. Each tubular section includes a first end portion 16 and a second end portion 17. One or more milk inlet connections 19 are connected to the second conduit 14 for directing milk thereto.

A right angle connector 20 is connected to the second conduit 14. The right angle connector includes enlarged end portions 21. A right angle connector 20 is shown connected to each of the opposite ends of the second conduit 14. The right angle connectors 20 are made of a resilient or rubber like material and each connector 20 includes an enlarged end portion 21. A right angle bore or passage 22 is provided in each connector 20. Each enlarged end portion 21 includes an abutment or annular shoulder 23 provided immediately adjacent the end of the enlarged portion 21. The outer surface of the enlarged end portion is provided with a circumferentially extending V-shaped recess 24.

In order to securely connect the right angle connectors 20 to the pipe-line or conduit 11 rings 25 are provided. The rings 25 include a conforming wall portion 26 which resiliently is carried or fits into the V-shaped recess 24. A bracket 27 is connected to each ring 25 and each bracket 27 includes arms 28 extending substantially parallel to the axis of each ring 25. As seen in Figure 1 the arms 28 of one bracket 27 are in engagement with the conduit 11. The other bracket 27 is in engagement with the right angle connector 13. Oppositely disposed ears 29 are provided on the bracket 27 and these ears are suitably engaged by a U-bolt 30 which is disposed about the conduits 11 and the right angle connectors 13 as indicated. Nuts 32 serve to adjustably secure the brackets 27 in position.

In the connection of the right angle connectors 20 to the conduits 11 and the connector 13 an auxiliary clamping collar 33 may be utilized. The clamping collar 33 includes an inner annular tapering wall 34 which conforms to the tapering outer surface of the enlarged portions 21. Each clamping collar 33 has disposed thereon, on opposite sides, a pair of ears 35. The ears 35 may be placed into longitudinal alignment with the ears 31 and a screw 36 may be disposed within the ears 31 and 35 so that upon the tightening of a nut 37 with respect to the screw 36 the collar 33 may be drawn toward the ring 25 thus causing the resilient end portion 21 to become tightly engaged with respect to one of the tubular sections 15.

As indicated in Figure 1 connector sleeves 38 are supported between the right angle connectors 20. The connector sleeves 38 are of a rubber like material, each including a bore 39. The outer surface of the sleeves 38 are tapered as indicated at 39'. Within each sleeve 38, there is provided an annular projection 40 the same providing an abutment which is engaged by the ends 16 and 17 of the tubular sections 15. An outer V-shaped recess 41 is provided on each sleeve 38. The recess 41 may be described as V-shaped, including annular diverging walls as indicated. In order to connect the sleeves 38 in supporting and sealing relation with respect to the tubular sections 15 the rings 25 and brackets 27 are utilized. Each ring 25 is disposed within each recess 41 so that the sleeve 38 to which said ring is connected, may be securely though resiliently supported with respect to the conduit 11.

Assembly and disassembly of the separable sections 15 will now be described. The conduit 11 is generally supported in a stationary manner on surrounding structure adjacent the milking parlors. In the arrangement shown in Figure 1 where the milk-line or second conduit 14 includes one or more right angle turns the right angle connectors 20 are utilized. As shown on the right hand side of Figure 1, a right angle connector 20 has one of its enlarged end portions 21 supported on the connector 13 by means of the ring 25 and bracket 27. By securely tightening the U-bolt 30 the right angle connector 20 is firmly supported. In order to connect a tubular section 15 to the connector 20 the collar 33 is tightened and a firm joint is effected. The other end of the tubular connector 20 is suitably supported on the pipe 11 by means of the other bracket assembly 27 and ring 25. With this initial connection of parts it is now possible to quickly assemble the other tubular sections 15. Only a few of the tubular sections have been shown but it is of course apparent that an indefinite number of such sections may now be connected in communicaitng relation. The end 16 of one of the tubular sections 15 is now inserted in the free end portion 21 until the end 16 is in abutment with the shoulder or abutment 23. The next step is to slip a sleeve 38 over the end 17 until the end 17 is in abutment with the portion 40. A bracket 27 suitably supports the sleeve 38 on the pipe 11. In order to effecuate a tight seal between the abutment 40 and the end 17 the following procedure is established: the U-bolt 30 is tightened only sufficiently relative to the bracket 27, so that it can be moved by tapping one of the arms 28 with a hammer or mallet. By tapping the arm 28 in this manner the bracket 27 can be moved longitudinally to the right whereupon the sleeve 38 is compressed or resiliently brought into contact with the end 17 so that the abutment 40 effectively engages the end 17 to provide a tight seal. The U-bolt 30 is now tightened further rigidly in position. By moving the bracket 27 to the right end, of course, also causes the tubular section 15 to resiliently engage in compressing relation to the abutment 23 of the connector 20. The same procedure is established for assembling the other tubular sections 15, the significant feature being that by partially tightening the bracket 27 and then by tapping it with a hammer or other device, endwise movement of the bracket 27 is effected whereupon the sleeve moves in such a manner that effective sealing is accomplished by the resilient or compressed engagement of the projections or abutments 40 with respect to the ends 16 and 17. Thus, a number of tubular sections may be effectively sealed in assembly and supported on the tubular pipe line 11. It is of course necessary to provide rigid means for anchoring the end of the tubular sections and this is accomplished by the right angle connector 20, the assembly of which has been described. By virtue of the brackets 27, which support the connector 20, the said connector is relatively rigidly supported so that endwise movement of the tubular sections into compressing relation with respect to the abutments 40 and 23 is effected. Use of the collars 33 in connection with the sleeves 38 thus is unnecessary with respect to the tubular sections 15 which are supported between the connectors 20.

As indicated in Figure 1 the connection of the tubular connector 20 on the left hand side is somewhat different than the connection of the connector 20 previously described. In this connection after all of the straight line tubular sections 15 have been assembled and a right angle turn is desired, a tubular connector 20 is firmly connected to the pipe-line 11 by a bracket 27, and the collar 33, which is clamped over one of the enlarged end portions 21 as indicated. The other end of this connector 20 is also suitably connected by means of one of the clamping collars 33 so that another tubular section 15 may be connected thereto in communicating and sealing relation. Thus it is apparent that wherever the tubular sections 15 are disposed in parallel relation with respect to the conduit 11 the sleeves 38 may be utilized and may be assembled and adjusted in the manner indicated and set forth in the above procedure. Since only one or two of the collars 33 may be needed at the extreme end portions of the assembly the separable tubular sections of the second conduit may be quickly and expeditiously disassembled and assembled. This is extremely desirable from the standpoint of maintenance so that the milk-line can be easily cleaned and maximum sanitation is effected.

Thus it can be seen that an improved pipe-line assembly has been shown and described. It is of course obvious that the assembly may be utilized in systems other than those used for milking and that the arrangement is particularly useful in all conduit connections where quickly separable elements are desired. Thus the objects of the invention have been fully achieved and it must be realized that modifications and further changes can be made which will not depart from the spirit of the invention as disclosed or from the scope of the appended claims.

What is claimed is:

1. A pipe-line assembly comprising first and second relatively radially spaced conduits, the second of said conduits including a plurality of separable tubular sections, means connecting adjacent ends of said tubular sections in connecting relation and to said first conduit, comprising a plurality of coupling devices positioned between adjacent ends of said tubular sections, each device comprising a connecting sleeve of resilient material, said sleeve having first and second longitudinally extending bores in communication and adapted to receive adjacent ends of said tubular sections in telescoping relation, an annular projection within said sleeve disposed between said first and second bores, said projection providing an abutment for said tube ends, a circumferentially extending outer recess of V-shaped cross section on said sleeve, a ring having an inner wall conforming substantially to the shape of said recess and being resiliently positioned therein, an attaching bracket connected to said ring, said bracket including a pair of arms connected to said ring and extending in opposite directions substantially parallel to the axis of said ring, said arms being in engagement with said first conduit and adjustable means connecting each bracket to said first conduit whereby one or more of said sections may be moved relatively longitudinally with respect to the first conduit into resilient engagement with the abutments of said sleeves, one of said adjustable means being adapted to connect one end of one of said tubular sections to said first conduit against relative longitudinal movement with respect to said first conduit.

2. A pipe-line assembly comprising first and second relatively laterally spaced conduits, the second of said conduits including a plurality of separable tubular sections, means connecting adjacent ends of said tubular sections in connecting relation and to said first conduit, comprising a plurality of coupling devices positioned between adjacent ends of said tubular sections, each device comprising a connecting sleeve of resilient material, said sleeve having first and second longitudinally extending bores in communication and adapted to receive adjacent ends of said tubular sections in telescoping relation, an annular projection within said sleeve disposed between said first and second bores, said projection providing an abutment for said tube ends, a circumferentially extending recess on said sleeve, a ring positioned within said recess, an attaching bracket connected to said ring, said bracket including a pair of arms connected to said ring, extending in opposite directions substantially parallel to the axis of said ring and being in engagement with said first conduit, and means adjustably connecting each bracket to said first conduit whereby one or more of said sections may be moved relatively longitudinally with respect to the first conduit into resilient engagement with the abutments of said sleeves.

3. A pipe-line assembly comprising first and second relatively laterally spaced conduits, the second of said conduits including a plurality of separable aligned tubular sections, means connecting adjacent ends of said tubular sections in connecting relation and to said first conduit, comprising a plurality of coupling devices positioned between adjacent ends of said tubular sections, each device comprising a flexible connecting sleeve, said sleeve having first and second longitudinally extending bores in communication and adapted to receive adjacent ends of said tubular sections in telescoping relation, an annular abutment within said sleeve disposed between said first and second bores, a circumferentially extending recess on said sleeve, a ring having an inner wall disposed within said recess, an attaching bracket connected to said ring, and means adjustably connecting each bracket to said first conduit whereby one or more of said sections may be moved relatively longitudinally with respect to the first conduit into engagement with the abutments of said sleeves.

4. A pipe-line assembly comprising first and second relatively radially spaced conduits, the second of said conduits including first and second aligned tubular sections, each section having first and second oppositely disposed ends, a first end of one section being disposed adjacent the second end of a second section, means connecting one of said sections on said first conduit, said means including a flexible tubular connector having a bore for receiving the first end of the first tubular section in telescoping relation, a first annular abutment within said connector engageable by the first end of the first tubular section, means connecting said tubular connector to said first conduit to anchor said connector against relative longitudinal displacement, a coupling device disposed between the second end of the first section and the first end of the second section, said coupling device including a flexible sleeve having a bore receiving the second end of said first section and the first end of the second section in telescoping relation, a second annular abutment in said bore engaged by said adjacent ends, a circumferentially extending recess in said sleeve, a ring supported in said recess, an attaching bracket connected to said ring, said bracket having portions engaging said first conduit and extending in opposite directions and substantially parallel to the axis of said sleeve, and adjustable means for connecting said bracket to said first conduit.

5. A pipe-line assembly comprising first and second relatively radially spaced conduits, the second of said conduits including first and second aligned tubular sections, each section having first and second oppositely disposed ends, a first end of one section being disposed adjacent the second end of a second section, means connecting one of said sections on said first conduit comprising a flexible tubular connector having a bore for receiving the first end of the first tubular section in telescoping relation, a first abutment within said connector engageable by the first end of the first tubular section, means connecting said tubular connector to said first conduit to anchor said connector against relative longitudinal displacement, a coupling device disposed between the second end of the first section and the first end of the second section, said coupling device including a flex-ible sleeve having a bore receiving the second section in telescoping relation, a second abutment in said bore engaged by said adjacent ends, a recess in said sleeve, a ring supported in said recess, an attaching bracket connected to said ring, and adjustable means for connecting said bracket to said first conduit.

6. A pipe-line assembly comprising first and second relatively radially spaced conduits, the second of said conduits including first and second aligned tubular sections, each section having first and second oppositely disposed ends, a first end of one section being disposed adjacent the second end of a second section, means connecting one of said sections on said first conduit comprising a flexible tubular connector having a bore for receiving the first end of the first tubular section in telescoping relation, a first abutment within said connector engageable by the first end of the first tubular section, means connecting said tubular connector to said first conduit to anchor said connector against relative longitudinal displacement, a coupling device disposed between the second end of the first section and the first end of the second section, said coupling device including a flexible sleeve having a bore receiving the second end of said first section and the first end of the second section in telescoping relation, a second abutment in said bore engaged by said adjacent ends, a ring resiliently supported on said sleeve, an attaching bracket connected to said ring, and adjustable means for connecting said bracket to said first conduit.

7. A pipe-line assembly comprising first and second relatively radially spaced conduits, the second of said conduits including first and second aligned tubular sections, each section having first and second oppositely disposed ends, a first end of one section being disposed adjacent the second end of a second section, means connecting one of said sections on said first conduit comprising a flexible tubular connector having a bore for receiving the first end of the first tubular section in telescoping relation, means connecting said tubular connector to said first conduit to anchor said connector against relative longitudinal displacement, a coupling device disposed between the second end of the first section and the first end of the second section, said coupling device including a flexible sleeve having a bore receiving the second end of said first section and the first end of the second section in telescoping relation, an abutment in said bore engaged by said adjacent ends, a ring supported on said sleeve, an attaching bracket connected to said ring, and adjustable means for connecting said bracket to said first conduit.

8. A pipe-line assembly comprising first and second relatively radially spaced conduits, the second of said conduits including first and second aligned tubular sections, each section having first and second oppositely disposed ends, a first end of one section being disposed adjacent the second end of a second section, means connecting one of said sections on said first conduit comprising a flexible tubular connector having a bore for receiving the first end of the first tubular section in telescoping relation, means connecting said tubular connector to said first conduit to anchor said connector against relative longitudinal displacement, a coupling device disposed between the second end of the first section and the first end of the second section, said coupling device including a flexible sleeve having a bore reeciving the second end of said first section and the first end of the second section in telescoping relation, a ring supported on said sleeve, an attaching bracket connected to said ring, and means connecting said bracket to said first conduit.

9. A pipe-line assembly comprising first and second relatively radially spaced conduits, the second of said conduits including first and second aligned sections, each section having first and second oppositely disposed ends, a first end of one section being positioned adjacent the second end of a second section, means connecting one of said sections to said first conduit against relative longitudinal displacement, a coupling member disposed between adjacent ends of said sections, said coupling member including a flexible sleeve having an open-end bore receiving said adjacent ends in telescoping relation, a flexible abutment projecting radially inwardly within said bore, said abutment being engaged by said adjacent ends in sealing relation, a bracket connected to said sleeve, and means adjustably connecting said bracket to said first conduit.

10. A pipe-line assembly comprising first and second relatively radially spaced conduits, the second of said conduits including first and second aligned tubular sections, each section having first and second oppositely disposed ends, a first end of one section being disposed adjacent the second end of a second section, means connecting one of said sections to said first conduit against relative longitudinal displacement, a coupling device disposed between the second end of the first section and the first end of the second section, said coupling device including a flexible sleeve having a bore receiving the second section in telescoping relation, an abutment in said bore engaged by said adjacent ends, an annular recess in said sleeve, a ring supported in said recess, an attaching bracket connected to said ring, and adjustable means for connecting said bracket to said first conduit.

References Cited in the file of this patent
UNITED STATES PATENTS

| | | |
|---|---|---|
| 1,273,471 | Ferris | July 23, 1918 |
| 2,122,925 | Bins | July 5, 1938 |
| 2,187,217 | Winslow | Jan. 16, 1940 |